United States Patent
Zhang et al.

(10) Patent No.: US 8,356,263 B1
(45) Date of Patent: Jan. 15, 2013

(54) YIELD BASED FLOP HOLD TIME AND SETUP TIME DEFINITION

(75) Inventors: Xiaonan Zhang, San Diego, CA (US); Xiaoliang Bai, San Diego, CA (US); Prayag B. Patel, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/172,951

(22) Filed: Jun. 30, 2011

(51) Int. Cl.
*G06F 9/455* (2006.01)

(52) U.S. Cl. ........ 716/108; 716/106; 716/111; 716/113; 716/134

(58) Field of Classification Search .................. 716/106, 716/108, 111, 113, 134
See application file for complete search history.

(56) References Cited

U.S. PATENT DOCUMENTS

2007/0124710 A1* 5/2007 Sakata ............................... 716/5
2008/0005707 A1* 1/2008 Papanikolaou et al. ........... 716/4

* cited by examiner

*Primary Examiner* — Vuthe Siek
*Assistant Examiner* — Brian Ngo
(74) *Attorney, Agent, or Firm* — Sam Talpalatsky; Nicholas J. Pauley; Jonathan T. Velasco

(57) ABSTRACT

Systems and method for defining a timing parameter for a circuit element based on process variation, including, determining a point of failure parameter associated with the timing parameter, the point of failure parameter correlated with a specific value of the process variation. A standard deviation associated with the point of failure parameter is determined. The process variation per the standard deviation is calculated and the timing parameter for the circuit element is defined as a function of the failure parameter, the standard deviation, and the process variation per the standard deviation. A margin factor, which varies with the standard deviation, is optionally applied to the timing parameter. The timing parameter may be one of a setup time or hold time.

43 Claims, 4 Drawing Sheets

YIELD BASED FLOP HOLD TIME AND SETUP TIME DEFINITION

FIELD OF DISCLOSURE

Disclosed embodiments are directed to definitions for setup time and hold time for flop elements. More particularly, exemplary embodiments are directed to setup and hold time definitions which include the impact of process variations, wherein the definitions are associated with a point of failure of the flop element.

BACKGROUND

Accurate definitions for setup and hold times in flip-flops, latch circuits and the like (hereinafter, "flop elements") are crucial in state of the art integrated circuit design and fabrication. Setup time generally refers to the minimum amount of time that a data signal entering a flip flop must be stable before a clock edge; and hold time refers to the minimum amount of time that the data signal must be stable after the clock edge. Setup and hold times are defined to reliably sample the data signal and avoid metastability.

With increasing variation among fabrication processes, traditional setup and hold time definitions for flop elements are becoming outdated and impractical. The conventional setup and hold time definitions rely on a factor of 10% of the push out of clock-to-q delay as shown in FIGS. 1A-B. This conventional definition inherently assumes that all transistors on a chip are equally fast, which is not a practical assumption. The conventional definition also ignores the effect of circuit topologies, which in fact affect setup and hold times of individual flop elements. Another problem with the conventional definition is that it ignores the differences in setup and hold time requirements in scan/test mode and normal operation. Scan tests are typically performed at low speed and 10% push out of clock-to-q is insufficient to cause failures and accurately test the flop elements.

Existing approaches for overcoming the above problems with conventional 10% push-out of clock-to-q definitions include, monitoring a voltage at an internal node of associated with the setup and hold. The approach assumes that once the monitored voltage reaches a predetermined threshold, such as 15% of supply voltage (Vdd), the data signal sampled by the flop element may become unstable. Setup and hold times are defined based on the times taken to reach the predetermined threshold. However, if the predetermined threshold is set too low, such as 10% of Vdd, the circuits are rendered excessively sensitive to noise and crosstalk; and if the predetermined threshold is set too high, then low Vdd circuits are adversely impacted.

Another approach to overcome the problems with the 10% push-out of clock-to-g definitions includes defining setup and hold times based on an internal latch node voltage glitch level. This approach attempts to account for setup and hold time dependencies on circuit topology. However, this approach also is voltage dependent and does not work well for low Vdd circuits.

In addition to aforementioned drawbacks, the current approaches for characterizing setup and hold time requirements, suffer from another serious drawback, in that they ignore the importance of yield on the setup and hold time definitions. In general, yield refers to a percentage of circuit elements which perform properly once a chip is fabricated, and is a function of the number of circuits integrated on a chip. It is observed that the setup and hold times required for a chip with fewer flop elements is lower than the setup and hold time requirements for a chip with millions of flop elements. Accordingly, yield must be accounted for in setup and hold time definitions.

Therefore there is a need in the art for setup and hold time definitions which overcome drawbacks of current approaches, while faithfully accounting for process variations and yield based dependencies.

SUMMARY

Exemplary embodiments of the invention are directed to systems and method for defining a timing parameter of a circuit element based on process variation.

Accordingly, an exemplary embodiment is directed to method for defining a timing parameter for a circuit element design comprising: determining a point of failure parameter associated with the timing parameter, the point of failure parameter correlated with a specific value of a process variation. A standard deviation associated with the point of failure parameter is determined. The process variation per the standard deviation is calculated and the timing parameter for the circuit element is defined as a function of the failure parameter, the standard deviation, and the process variation per the standard deviation.

Another exemplary embodiment is directed to an apparatus configured to determine a timing parameter for a circuit element comprising: logic configured to determine a point of failure parameter associated with the timing parameter, the point of failure parameter correlated with a specific value of a process variation. The apparatus includes logic configured to determine a standard deviation associated with the point of failure parameter, logic configured to determine the process variation per the standard deviation, and logic configured to determine the timing parameter for the circuit element as a function of the failure parameter, the standard deviation, and the process variation per the standard deviation.

Yet another exemplary embodiment is directed to a system for defining a timing parameter for a circuit element design comprising means for determining a point of failure parameter associated with the timing parameter, the point of failure parameter correlated with a specific value of a process variation and means for determining a standard deviation associated with the point of failure parameter. The system includes means for determining the process variation per the standard deviation and means for defining the timing parameter for the circuit element as a function of the failure parameter, the standard deviation, and the process variation per the standard deviation.

A further exemplary embodiment is directed to a method for defining a timing parameter for a circuit element design comprising: step for determining a point of failure parameter associated with the timing parameter, the point of failure parameter correlated with a specific value of a process variation, step for determining a standard deviation associated with the point of failure parameter, step for determining the process variation per the standard deviation, and step for defining the timing parameter for the circuit element as a function of the failure parameter, the standard deviation, and the process variation per the standard deviation.

Another exemplary embodiment is directed to a non-transitory computer-readable storage medium comprising code, which, when executed by a processor, causes the processor to perform operations for defining a timing parameter for a circuit element design, the non-transitory computer-readable storage medium comprising: code for determining a point of failure parameter associated with the timing parameter, the point of failure parameter correlated with a specific value of a process variation, code for determining a standard deviation associated with the point of failure parameter, code for determining the process variation per the standard deviation, and code for defining the timing parameter for the circuit element as a function of the failure parameter, the standard deviation, and the process variation per the standard deviations.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Figure 1A:
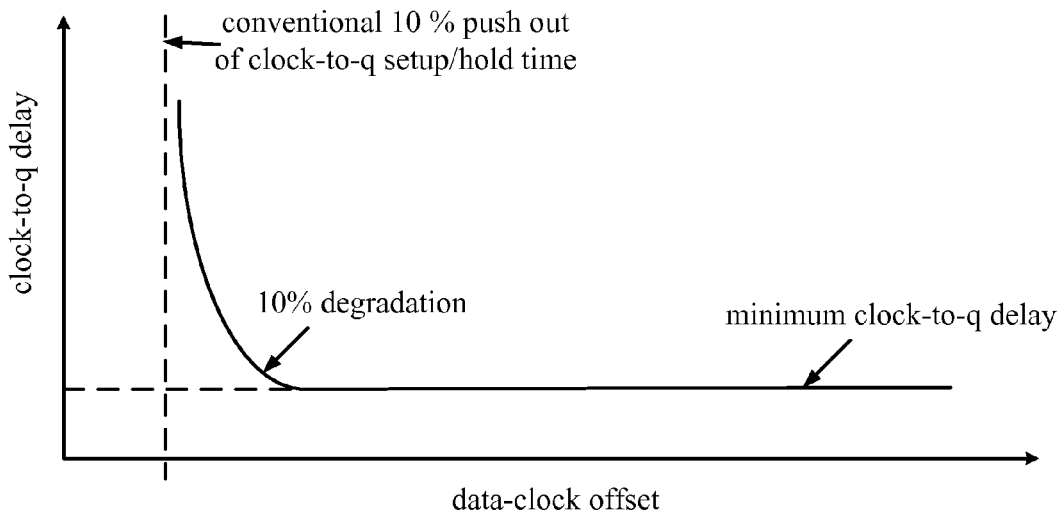
FIG. 1A graphically illustrates a conventional 10% push out of clock-to-q delay as definitions for setup and hold times in flop elements.
Figure 1B:
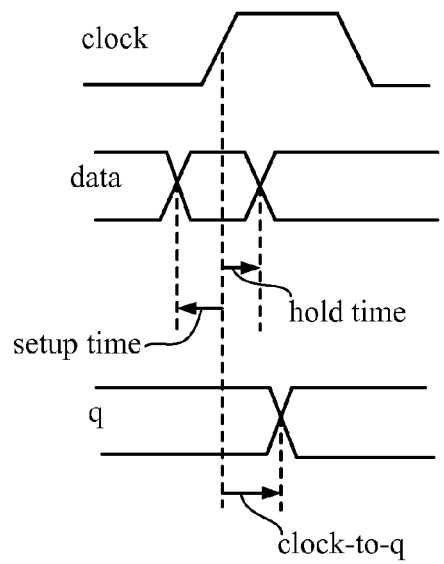
FIG. 1B illustrates timing diagrams for conventional setup, hold and clock-to-q delay times.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated, circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Exemplary embodiments recognize the need for taking into account process variation, such as yield, in defining setup and hold times for flop elements. As previously mentioned, yield is a function of the number of circuits on a chip. An exemplary function for yield may be cast in terms of the equation: "$Y(N)=Y_S^N$", wherein, $Y_S$ is the yield of a single circuit, such as a flop element; N is the total number of such single circuits on a chip, and Y(N) is the total yield of all such circuits on the chip. The following table, TABLE 1, illustrates the total yield Y(N) of flop elements on a chip per standard deviation sigma (G) of single flop yield values $Y_S$. it will be seen that for a million flop elements (N=1e6), the total yield is in the same range as a single flop yield over a 6σ variation. Therefore definitions of setup and hold time in exemplary embodiments are formulated with the targeted total yield of flop elements on a chip.

TABLE 1

Variation of total yield on SoC for particular single flop yield.

| # of Sigma | Ys | Y (1e2) | Y (1e3) | Y (1e4) | Y (1e6) |
|---|---|---|---|---|---|
| 2.33 | 98.000% | 13.26% | 0 | 0 | 0 |
| 2.58 | 99.000% | 36.60% | 0.004% | 0 | 0 |
| 2.81 | 99.500% | 60.58% | 0.67% | 0 | 0 |
| 3.09 | 99.900% | 90.48% | 36.77% | 0.005% | 0 |
| 3.89 | 99.990% | 99.00% | 90.48% | 36.79% | 0 |
| 4.41 | 99.999% | 99.90% | 99.00% | 90.48% | 0 |
| 5? | 99.9999% | 99.99% | 99.90% | 99.00% | 36.79% |
| 6 | 99.9999998% | 1 | 1 | 1 | 99.80% |

Initially, it will be recognized that conventional definitions such as 10% push out of clock-to-q delay, define setup and hold times based on an onset of failures/metastability of flop elements. In contrast, disclosed techniques first determine a point of failure. The point of failure is correlated to a specific value of a process variation. For example, the point of failure may be correlated to a mean value of yield. Variations in the process, such as yield, per standard deviation (σ) from the specific value are then determined. Setup and hold time definitions for flop elements, for any given value of the process variation, are then postulated as a function of the point of failure, the standard deviation of the given value of the process variation from the specific value, and the process variation per the standard deviations. Monte-Carlo simulations are performed on exemplary systems to verify the accuracy of the definitions for timing parameters such as setup and hold times.

Figure 2:
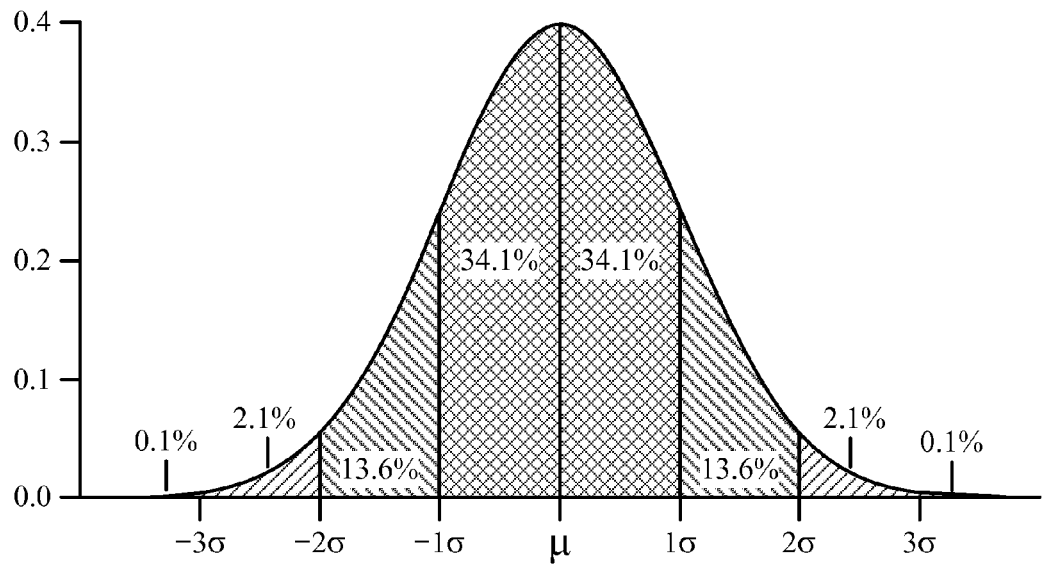
FIG. 2 illustrates a Gaussian distribution of setup/hold times corresponding to yield values in an exemplary system on a chip

With reference now to FIG. 2, there is shown statistical function timing parameters, such as hold time and setup time, based on a point of failure and process variation, for flop elements in an exemplary system on a chip. As illustrated, µ is a mean value of process variation. For example, µ may represent 50% yield in an embodiment. A timing parameter Tf may correspond to a point of failure correlated to µ. Tf may be determined by well known techniques, such as Monte-Carlo simulations. A bell curve, or Gaussian distribution, may be plotted using data from Monte-Carlo simulations, as shown. The bell curve provides a variation of setup and hold times as a function of yield per standard deviation (σ).

For example, with continuing reference to FIG. 2, about 68% of all yield values correspond to setup and hold time values that are within one n variation from the mean. Similarly, almost all yield values are observed to have setup and hold time values which lie within a 3σ variation from the mean. With this variation per standard deviation (σ) in mind, a new definition for the timing parameter, T(ps), may be represented by the equation: "$T(ps)=Tf+(\sigma*VPS)$", wherein, as previously described, Tf corresponds to the point of failure for a specific target yield value (such as a mean value, μ shown in FIG. 2); σ is the standard deviation; and VPS is the variation in the timing parameter per σ. By knowing a target yield value, designers/design automation tools may model timing parameters such as setup and hold time values for circuit elements such as flop elements, by calculating the standard deviation of the target yield value from the yield value corresponding to the point of failure, Tf.

While the new definition presented above provides far more accurate modeling of setup and hold times than conventional 10% push out of clock-to-q delay, the definition may be further refined by introducing a margin factor to compensate for inaccuracies in certain cases. The outliers, i.e. high sigma regions, may not be as faithful to the Gaussian model shown in FIG. 2, as the low sigma regions. The VPS factor defined above already accounts for variations in transistor sizes and voltages across the sigmas. Therefore, the margin factor may be defined independently of these variations in transistor sizes and voltages.

Another source of inaccuracy is sensitivity to power noise. Again, VPS may be highly dependent on threshold voltage of gates in the circuits. Therefore, VPS may be dependent on power noise sensitivity of the circuits. The power noise sensitivity may also be included in the VPS calculations, such that the margin factor can be defined independently of power noise sensitivity.

Accordingly, the margin factor can be formulated independent of voltage and transistor sizes, and in certain embodiments, independent of power noise sensitivity. Thus, an empirical constant "M" may be defined as a margin value for a given value of VPS, such that the margin factor, "Margin," is represented by the equation: "$Margin=M*VPS$). For example, for hold time of a flop element falling in a 6σ region, margin value M may be set as the value "3" in order to compensate for inaccuracies.

Thereby, a comprehensive definition incorporating the margin factor, for setup and hold times, may be defined as follows: "$T(ps)=Tf+(\sigma*VPS)+(M*VPS)$". As previously explained, this comprehensive definition is robust over all sigma ranges, and accounts for inaccuracies caused by variations in transistor sizes, voltages and power noise sensitivity. Moreover, the comprehensive definition accurately accounts for the effect of yield and other process variations on setup and hold time requirements of flop elements. More generally, the comprehensive definition may be easily extended to other timing parameters relevant to modeling circuit elements in systems on chip.

It will be appreciated that the comprehensive definition for timing parameters, "$T(ps)=Tf+(\sigma*VPS)+(M*VpS)$" solves problems with conventional definitions such as 10% push out of clock-to-q delay, by allowing designers and design automation tools to characterize the timing parameters quantitatively for various circuit elements based on yield and other process variations. This comprehensive definition also solves problems with defining the timing parameters too high (over margin) or too low (under margin). Moreover, the definition simplifies and speeds up Monte-Carlo simulations for verifying timing behavior of circuit elements on exemplary systems on chip.

Figure 3:
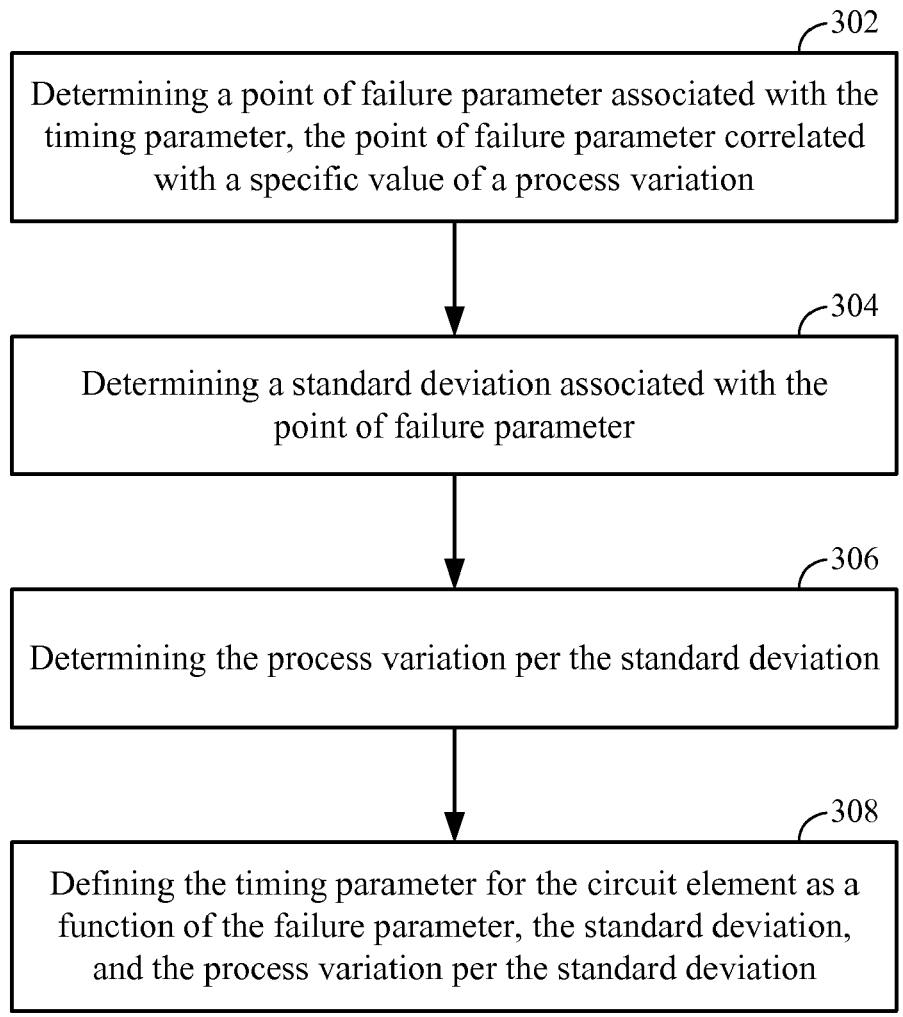
FIG. 3 illustrates a flow chart of an exemplary technique for defining timing parameters such as setup/hold time thr circuit elements such as flop elements.

It will also be appreciated that embodiments include various methods for performing the processes, functions and/or algorithms disclosed herein. For example, as illustrated in FIG. 3, an embodiment can include a method for defining a timing parameter for a circuit element design comprising: determining a point of failure parameter associated with the timing parameter, the point of failure parameter correlated with a specific value of a process variation (Block 302); determining a standard deviation associated with the point of failure parameter (Block 304); determining the process variation per the standard deviation (Block 306); and defining the timing parameter for the circuit element as a function of the failure parameter, the standard deviation, and the process variation per the standard deviations (Block 308).

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a method for defining a timing parameter for a circuit element design. Accordingly, the invention is not limited to illustrated examples and any means for performing the functionality described herein are included in embodiments of the invention.

Figure 4:
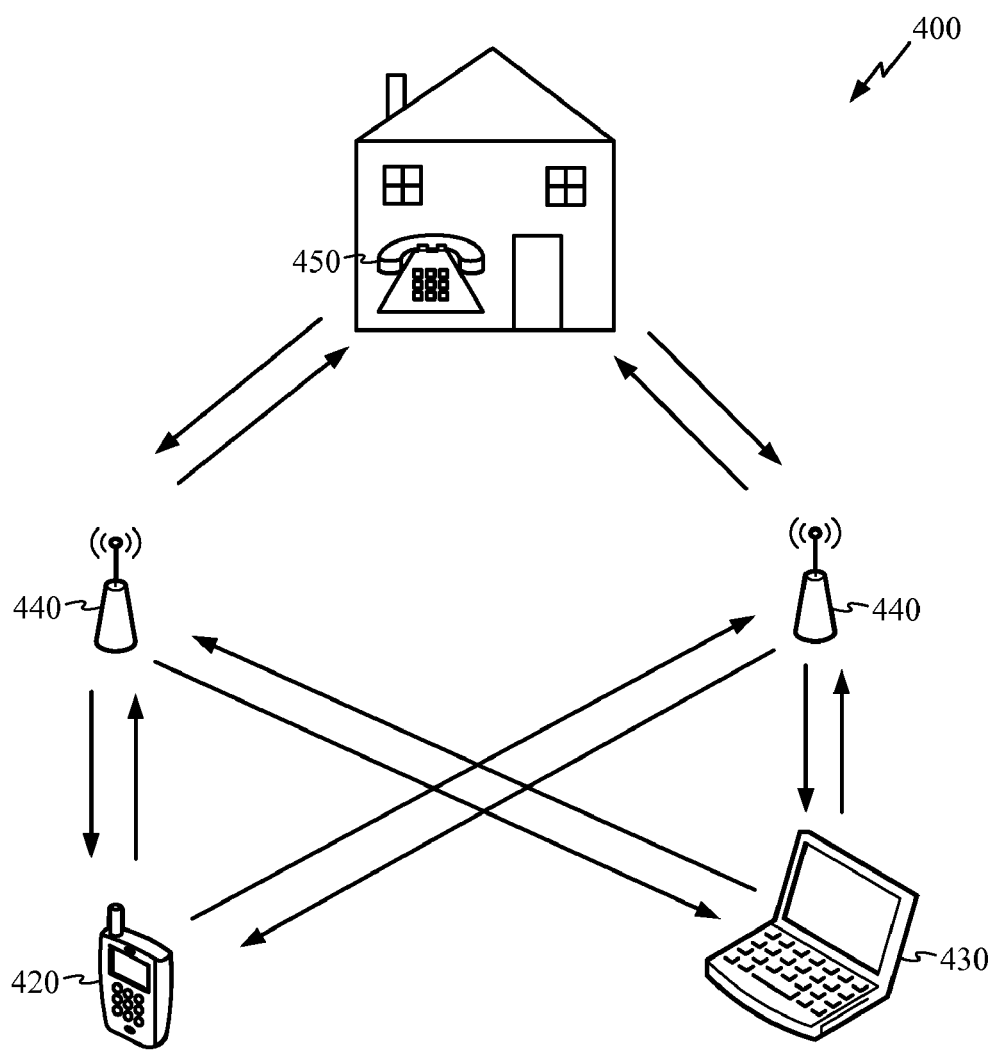
FIG. 4 illustrates an exemplary wireless communication system 400 in which an embodiment of the disclosure may be advantageously employed.

FIG. 4 illustrates an exemplary wireless communication system 400 in which an embodiment of the disclosure may be advantageously employed. For purposes of illustration, FIG. 4 shows three remote units 420, 430, and 450 and two base stations 440. In FIG. 4, remote unit 420 is shown as a mobile telephone, remote unit 430 is shown as a portable computer, and remote unit 450 is shown as a fixed location remote unit in a wireless local loop system. For example, the remote units may be mobile phones, hand-held personal communication systems (PCS) units, portable data units such as personal data assistants, GPS enabled devices, navigation devices, settop boxes, music players, video players, entertainment units, fixed location data units such as meter reading equipment, or any other device that stores or retrieves data or computer instructions, or any combination thereof. Although FIG. 4 illustrates remote units according to the teachings of the disclosure, the disclosure is not limited to these exemplary illustrated units. Embodiments of the disclosure may be suitably employed in any device which includes active integrated circuitry including memory and on-chip circuitry for test and characterization.

The foregoing disclosed devices and methods are typically designed and are configured into GDSII and GERBER computer files, stored on a computer readable media. These files are in turn provided to fabrication handlers who fabricate devices based on these files. The resulting products are semiconductor wafers that are then cut into semiconductor die and packaged into a semiconductor chip. The chips are then employed in devices described above.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method for defining a timing parameter for a circuit element the method performed by a processor, the method comprising:
    determining a point of failure parameter associated with the timing parameter, the point of failure parameter correlated with a specific value of a process variation;
    determining a standard deviation associated with the point of failure parameter;
    determining the process variation per the standard deviation; and
    defining the timing parameter for the circuit element as a function of the point of failure parameter, the standard deviation, and the process variation per the standard deviation; wherein the method performed by a processor.

2. The method according to claim 1, further comprising applying a margin factor to the timing parameter.

3. The method according to claim 2, wherein the margin factor comprises a positive integer margin value multiplied by the variation per the standard deviation.

4. The method according to claim 1, wherein the process variation comprises a yield.

5. The method according to claim 1, wherein the circuit element comprises a latching element.

6. The method according to claim 1, wherein the timing parameter is one of: a setup time or a hold time.

7. The method according to claim 1, wherein the specific value of the process variation comprises a 50% yield value.

8. The method of claim 1, integrated in a process of manufacturing a semiconductor die.

9. An apparatus configured to determine a timing parameter for a circuit element comprising:
    logic configured to determine a point of failure parameter associated with the timing parameter, the point of failure parameter correlated with a specific value of a process variation;
    logic configured to determine a standard deviation associated with the point of failure parameter;
    logic configured to determine the process variation per the standard deviation; and
    logic configured to determine the timing parameter for the circuit element as a function of the point of failure parameter, the standard deviation, and the process variation per the standard deviation.

10. The apparatus according to claim 9, further comprising logic configured to apply a margin factor to the timing parameter.

11. The apparatus according to claim 10, wherein the margin factor comprises a positive integer margin value multiplied by the variation per the standard deviation.

12. The apparatus according to claim 9, wherein the process variation comprises a yield.

13. The apparatus according to claim 9, wherein the circuit element comprises a latching element.

14. The apparatus according to claim 9, wherein the timing parameter is one of: a setup time or a hold time.

15. The apparatus according to claim 9, wherein the specific value of the process variation comprises a 50% yield value.

16. The apparatus according to claim 9, integrated in at least one semiconductor die.

17. The apparatus according to claim 9, integrated into a device selected from the group consisting of a set top box, music player, video player, entertainment unit, navigation device, communications device, personal digital assistant (PDA), fixed location data unit, and a computer.

18. A system configured for defining a timing parameter associated with a circuit element comprising:
    means for determining a point of failure parameter associated with the timing parameter, the point of failure parameter correlated with a specific value of a process variation;
    means for determining a standard deviation associated with the point of failure parameter;
    means for determining the process variation per the standard deviation; and
    means for defining the timing parameter for the circuit element as a function of the point of failure parameter, the standard deviation, and the process variation per the standard deviation.

19. The system according to claim 18, further comprising means for applying a margin factor to the timing parameter.

20. The system according to claim 19, wherein the margin factor comprises a positive integer margin value multiplied by the variation per the standard deviation.

21. The system according to claim 18, wherein the process variation comprises a yield.

22. The system according to claim 18, wherein the circuit element comprises a latching element.

23. The system according to claim 18, wherein the timing parameter is one of: a setup time or a hold time.

24. The system according to claim 18, wherein the specific value of the process variation comprises a 50% yield value.

25. The system according to claim 18, integrated in at least one semiconductor die.

26. The system according to claim 18, integrated into a device selected from the group consisting of a set top box, music player, video player, entertainment unit, navigation device, communications device, personal digital assistant (PDA), fixed location data unit, and a computer.

27. A method for defining a timing parameter for a circuit element the method performed by a processor, the method comprising:

step for determining a point of failure parameter associated with the timing parameter, the point of failure parameter correlated with a specific value of a process variation;

step for determining a standard deviation associated with the point of failure parameter;

step for determining the process variation per the standard deviation; and step for defining the timing parameter for the circuit element as a function of the point of failure parameter, the standard deviation, and the process variation per the standard deviation; wherein at least one of the steps performed by a processor.

28. The method according to claim 27, further comprising step for applying a margin factor to the timing parameter.

29. The method according to claim 28, wherein the margin factor comprises a positive integer margin value multiplied by the variation per the standard deviation.

30. The method according to claim 27, wherein the process variation comprises a yield.

31. The method according to claim 27, wherein the circuit element comprises a latching element.

32. The method according to claim 27, wherein the timing parameter is one of: a setup time or a hold time.

33. The method according to claim 27, wherein the specific value of the process variation comprises a 50% yield value.

34. The method according to claim 27, integrated in a process of manufacturing a semiconductor die.

35. A non-transitory computer-readable storage medium comprising code, which, when executed by a processor, causes the processor to perform operations for defining a timing parameter for a circuit element design, the non-transitory computer-readable storage medium comprising:

code for determining a point of failure parameter associated with the timing parameter, the point of failure parameter correlated with a specific value of a process variation;

code for determining a standard deviation associated with the point of failure parameter;

code for determining the process variation per the standard deviation; and code for defining the timing parameter for the circuit element as a function of the point of failure parameter, the standard deviation, and the process variation per the standard deviations.

36. The non-transitory computer-readable storage medium according to claim 35, further comprising code for applying a margin factor to the timing parameter.

37. The non-transitory computer-readable storage medium according to claim 36, wherein the margin factor comprises a positive integer margin value multiplied by the variation per the standard deviation.

38. The non-transitory computer-readable storage medium according to claim 35, wherein the process variation comprises a yield.

39. The non-transitory computer-readable storage medium according to claim 35, wherein the circuit element comprises a latching element.

40. The non-transitory computer-readable storage medium according to claim 35, wherein the timing parameter is one of: a setup time or a hold time.

41. The non-transitory computer-readable storage medium according to claim 35, wherein the specific value of the process variation comprises a 50% yield value.

42. The non-transitory computer-readable storage medium according to claim 35, integrated in at least one semiconductor die.

43. The non-transitory computer-readable storage medium according to claim 35, integrated into a device selected from the group consisting of a set top box, music player, video player, entertainment unit, navigation device, communications device, personal digital assistant (PDA), fixed location data unit, and a computer.

* * * * *